(12) United States Patent
Sugianto

(10) Patent No.: US 10,919,715 B2
(45) Date of Patent: Feb. 16, 2021

(54) FILTER MOVING DEVICE

(71) Applicant: Lonza Ltd., Visp (CH)

(72) Inventor: Danny Sugianto, Singapore (SG)

(73) Assignee: Lonza Ltd, Visp (CH)

(*) Notice: Subject to any disclaimer, the term of this patent is extended or adjusted under 35 U.S.C. 154(b) by 4 days.

(21) Appl. No.: 16/345,929

(22) PCT Filed: Nov. 7, 2017

(86) PCT No.: PCT/IB2017/056961
§ 371 (c)(1),
(2) Date: Apr. 29, 2019

(87) PCT Pub. No.: WO2018/092000
PCT Pub. Date: May 24, 2018

(65) Prior Publication Data
US 2020/0062517 A1 Feb. 27, 2020

Related U.S. Application Data

(60) Provisional application No. 62/423,498, filed on Nov. 17, 2016.

(51) Int. Cl.
*B65G 59/02* (2006.01)
*B01D 29/46* (2006.01)
*B01D 25/00* (2006.01)
*B01D 46/40* (2006.01)
*B65G 59/00* (2006.01)
*B01D 46/52* (2006.01)

(52) U.S. Cl.
CPC ............. *B65G 59/02* (2013.01); *B01D 25/18* (2013.01); *B01D 29/46* (2013.01); *B01D 46/406* (2013.01); *B01D 46/526* (2013.01); *B65G 59/005* (2013.01)

(58) Field of Classification Search
CPC ..... B65G 59/02; B65G 59/023; B65G 59/005
USPC .............. 414/789.9, 790.2; 294/81.52, 67.32
See application file for complete search history.

(56) References Cited

U.S. PATENT DOCUMENTS

| | | | |
|---|---|---|---|
| 2,500,791 A | 3/1950 | Baldwin | |
| 3,559,371 A | * 2/1971 | Borrowman | ............ B65B 23/02 |
| | | | 53/390 |
| 3,712,460 A | 1/1973 | Kitajima | |
| 4,159,249 A | 6/1979 | Schotten | |
| 4,479,426 A | 10/1984 | Olenfalk | |
| 5,167,801 A | 12/1992 | Kawasaki | |
| 5,656,491 A | 8/1997 | Cassani et al. | |
| 5,858,231 A | 1/1999 | Drori | |

(Continued)

OTHER PUBLICATIONS

PCT/IB2017/056961, International Search Report and Written Opinion dated Feb. 14, 2018.

(Continued)

*Primary Examiner* — Ronald P Jarrett
(74) *Attorney, Agent, or Firm* — Dority & Manning, PA

(57) ABSTRACT

A filter moving device is disclosed that is designed to lift and move a filter cartridge stack comprised of individual filter cartridges. The filter cartridge stack, for instance, may comprise a plurality of disk-shaped filter cartridges. The filter moving device is designed to be placed over the stack. The device includes lifting elements that engage the stack for removing the stack from a filter assembly and/or installing the stack in a filter assembly.

19 Claims, 7 Drawing Sheets

(56) References Cited

U.S. PATENT DOCUMENTS

| | | | |
|---|---|---|---|
| 6,113,778 A * | 9/2000 | Kemp | B01D 29/39 |
| | | | 210/85 |
| 6,139,253 A * | 10/2000 | Battrel | B01D 25/26 |
| | | | 414/796.9 |
| 7,629,167 B2 | 12/2009 | Hodge et al. | |
| 8,298,054 B2 | 10/2012 | Hodge et al. | |
| 8,771,635 B2 | 7/2014 | Mohtadi et al. | |
| 9,388,373 B2 | 7/2016 | Rao et al. | |
| 2002/0023873 A1 | 2/2002 | Blaze et al. | |
| 2009/0305626 A1 | 12/2009 | Hope | |
| 2012/0077429 A1 | 3/2012 | Wernimont et al. | |
| 2014/0224748 A1 | 8/2014 | Bryan et al. | |
| 2016/0097074 A1 | 4/2016 | Collins et al. | |
| 2016/0175744 A1 | 6/2016 | Lucas et al. | |

OTHER PUBLICATIONS

3M Purification Inc., Zeta Plus™ Single Use Depth Filtration Product Portfolio, Product Information dated 2014, 16 pages.

\* cited by examiner ved filing date of Nov. 7, 2017, which claims priority to U.S. Provisional Application No. 62/423,498 having a filing date of Nov. 17, 2016, all of which are hereby incorporated by reference herein in their entirety for all purposes.

FILTER MOVING DEVICE

CROSS REFERENCE TO RELATED APPLICATIONS

This application is the U.S. National Stage entry of International Application Number PCT/IB2017/056961 filed under the Patent Cooperation Treaty and having a filing date of Nov. 7, 2017, which claims priority to U.S. Provisional Application No. 62/423,498 having a filing date of Nov. 17, 2016, all of which are hereby incorporated by reference herein in their entirety for all purposes.

RELATED APPLICATION

The present application is based on and claims priority to U.S. Provisional Patent application Ser. No. 62/423,498, filed on Nov. 17, 2016, and which is incorporated herein by reference.

BACKGROUND

Various different filter assemblies exist for filtering all different types of materials. For example, filter assemblies are used to filter fluids in the pharmaceutical field, in the food service industry, and in the water purity industry. The configuration of the filter assembly can depend upon the fluid being filtered. In general, the filter assembly is designed to receive a fluid and to filter out from the fluid contaminants or waste which may comprise particles or other substances that are dissolved, undissolved or immiscible in the liquid In one type of application, the filter assembly includes a plurality of filter cartridges that are arranged in a stack. The filter assembly may include a single stack of filter cartridges or may contain a plurality of stacks. A housing or dome is placed over the filter cartridge stacks and secured to a base assembly. In one embodiment, each of the filter cartridges are in the shape of a disk. For example these types of filter cartridges or individual filter cartridge cells can include two layers of filter media, separated from each other by an annular space. A fluid, such as a gas or liquid, typically flows from the outside of the filter media toward a central portion of the filter cartridge. These types of filter cartridges can be advantageous because they contain a significant amount of surface area for filtering large quantities of a fluid, especially when the filter cartridges are stacked together to form columns.

The filter assembly can further include an inlet and an outlet. A fluid to be filtered is sent through the inlet and into the housing. Once in the housing, the fluid is forced through the filter cartridges. For example, filter assemblies can be designed to operate at various pressures within the housing. The fluid pressure within the housing, for instance, can be greater than about 5 psi, such as greater than about 10 psi, such as greater than about 20 psi. Operating pressures can exceed, in some cases, 200 psi.

Once forced through the filter cartridges, contaminants contained within the fluid are removed by the filter media and the clean fluid is collected in an outlet.

Over time, the filter cartridges accumulate significant amounts of contaminants and waste. Due to the contaminants and waste, the filter cartridges begin to lose their efficiency. Consequently, the filter cartridges contained within the filter assembly are required to be removed and replaced on a periodic basis.

Removing and replacing the filter cartridges can be problematic. When filtering liquids, for instance, the individual filter cartridges can significantly increase in weight due to absorption making the cartridges less stable to handle. For example, wet filter cartridges have a tendency to have a non-uniform weight distribution which can cause cartridges to separate or otherwise fall apart during handling. A filter cartridge that breaks open during removal can cause various problems. For example, a spent filter cartridge can contain significant amounts of contaminants, which in some embodiments, may comprise biological materials or various chemical compounds. If allowed to escape from a filter cartridge, the filtered materials may contaminate the surrounding equipment, such as the filter assembly housing or base assembly. Thus, a broken cartridge can require a complete cleaning procedure to be completed on all surrounding equipment.

In the past, spent filter cartridges were removed from filter assemblies one at a time by completely disassembling a column of the cartridges. Manual removal of cartridges, however, can lead to human error, personal safety hazard, and worker exposure to the waste and contaminants that may be contained in the cartridges. Manual removal of the cartridges can also be time consuming and inefficient leading to relatively long down times of the filter process.

One method for removing a column of filter cartridge disk stacks is disclosed in U.S. Patent Publication No. 2002/0023873. In the above publication, a center post member is placed through the center of the disks and connected to a center post member for supporting the disks during movement. The above apparatus, however, can be somewhat difficult to install based upon the filter assembly configuration. In addition, the above apparatus also leaves the filter cartridges unprotected and exposed which may lead to cartridge breaks if the column of disks inadvertently contacts an adjacent device during movement.

In view of the above, a need exists for an improved apparatus and method for easily, safely and effectively removing, moving and installing a filter cartridge stack.

SUMMARY

In general, the present disclosure is directed to a filter moving device that can easily and efficiently remove, install and/or move a filter cartridge stack. The filter cartridge stack can be comprised of individual filter cartridges. For example, in one embodiment, each filter cartridge may have a disk-like shape. The filter removing device can be used to effectively install, remove, and/or transport a filter cartridge stack, such as a column of cell-type filter cartridges. The filter moving device can engage and move a filter cartridge stack while minimizing direct contact with workers and safety personal and while reducing downtime of the filter process.

In one embodiment, for instance, the present disclosure is directed to a filter moving device that comprises a frame having a first end and a second and opposite end. The first end of the frame comprises an open end leading to an interior space within the frame. The open end has a size and the frame has a height such that the open end of the frame can be placed over a filter cartridge stack for installing the stack in a filter assembly and/or for removing the stack from a filter assembly.

A plurality of lifting elements are located on the frame. The lifting elements are movable between an engaging position and a disengaging position. When the lifting elements are in the engaging position, the lifting elements engage a filter cartridge stack located within the interior of the frame. The filter moving device can further include a locking mechanism for locking the lifting elements in the engaging position.

The frame can have a cylindrical shape and can include a plurality of circular frame members attached together by a plurality of vertical frame members. In one embodiment, a greater number of circular frame members are positioned towards the open end of the frame in comparison to the number of circular frame members located towards the second end of the frame. The frame can further include a connector located at the second end of the frame that is configured to be attached to a lifting mechanism for raising and lowering the filter moving device. The lifting mechanism, for instance, may comprise a hoist or a crane that can lift and lower the filter moving device using a line or a chain. The frame may be made from different materials. In one embodiment, the frame is made from a metal, such as stainless steel.

As described above, the filter moving device includes lifting elements that engage a filter cartridge stack, such as individual filters contained in the stack. In one embodiment, the lifting elements are arranged in groups, wherein the lifting elements in a group are located at the same height on the frame and at different positions around the interior space of the frame. For example, the frame can have a circumference and a group of lifting elements can be equally spaced around the circumference at the same height. The filter moving device can include from about 2 to about 10 groups of lifting elements wherein each group is located at a different height on the frame. The groups of lifting elements can be equally spaced along the height of the frame or can be spaced along the height of the frame in an unequal arrangement. For example, the frame can include a bottom end and a top end and wherein the groups of lifting elements located at the bottom end are spaced closer together than the groups of lifting elements located at the top end.

In one embodiment, the lifting elements are arranged in vertical columns on the frame around the interior space of the frame. For instance, the device can include at least 3 vertical columns of lifting elements. In order to form vertical columns of lifting elements, the filter moving device may include a plurality of vertical rod members that are attached to the lifting elements. The vertical rod members can be pivotably attached to the frame so that the lifting elements can move or pivot between the engaging position and the disengaging position. The frame can include a circumference and the vertical rod members can be equally spaced around the circumference. The filter moving device can include from about 3 to about 6 vertical rod members.

In one embodiment, the vertical rod members have a top end that includes a cross member that extends across the interior space of the frame. The locking mechanism can engage the cross members of the vertical rod members for locking the lifting elements in the engaging position. For example, the cross members can overlap when the lifting elements are in an engaging position. Each cross member can define a locking aperture that aligns with the locking apertures on the other cross members. The locking mechanism may comprise a pin that extends through the apertures of the cross members for locking the lifting elements in the engaging position. If desired, the pin can be attached to a tether that is also attached to the frame.

In one embodiment, the cross members can also include handles. The handles can be used by an operator in order to move or pivot the lifting elements on the vertical rod members from the disengaging position to the engaging position and vice versa.

The present disclosure is also directed to a method for moving a filter cartridge stack in order to install or remove the filter cartridge stack from a filter assembly. The method includes the steps of placing the filter moving device as described above over a filter cartridge stack that contains a plurality of filter cartridges. In particular, the open end of the frame is place over the filter cartridge stack while the lifting elements are in the disengaging position. The lifting elements are then moved from the disengaging position to the engaging position such that the lifting elements are positioned below certain of the filter cartridges contained in the filter cartridge stack. Once the lifting elements are moved to the engaging position, the filter moving device can be raised in order to lift the filter cartridge stack and move the stack to a desired location.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
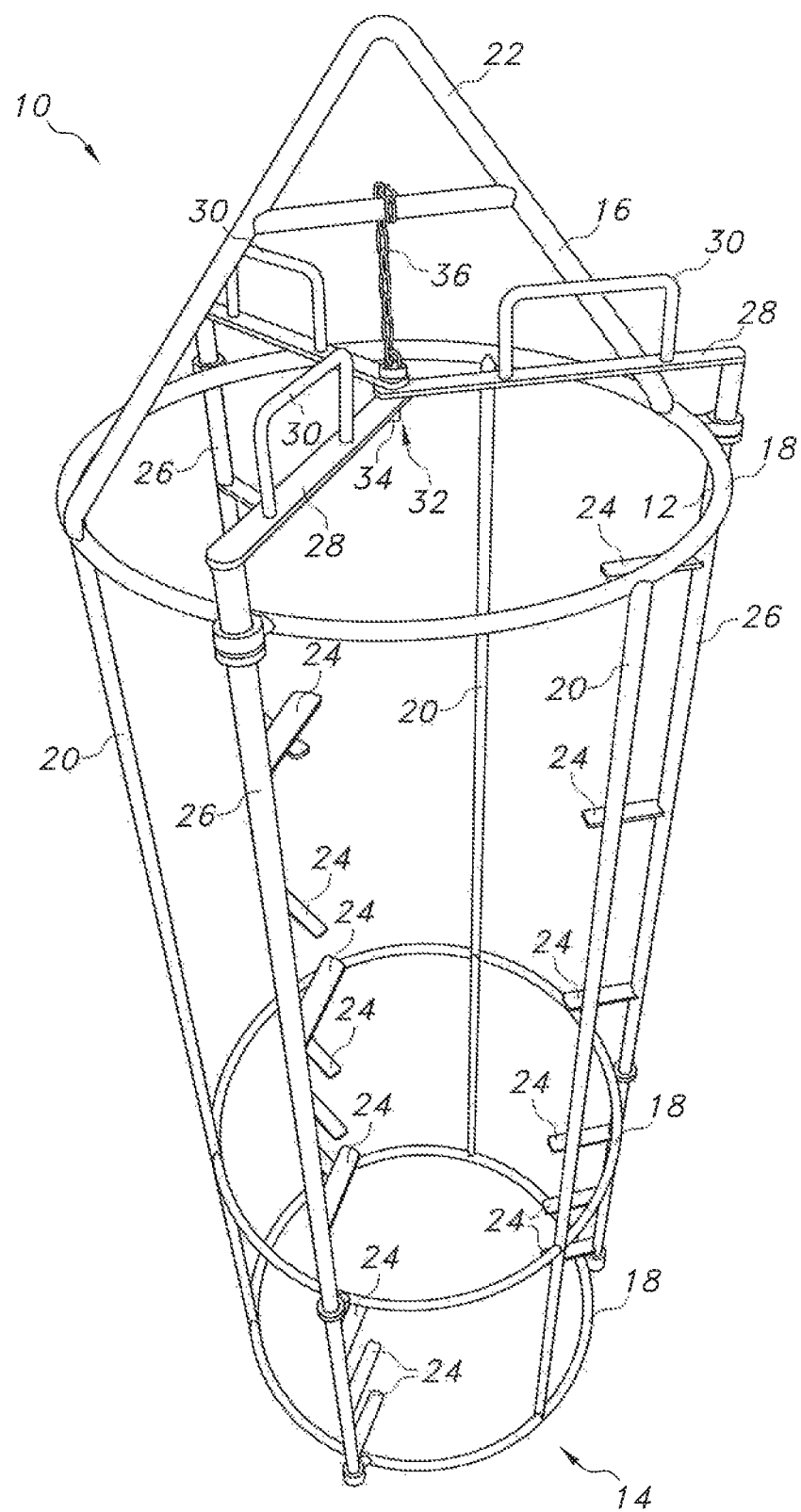
FIG. 1 is a perspective view of one embodiment of a filter moving device made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a filter moving device for engaging, lifting, and moving filter cartridges, such as a filter cartridge stack that comprises a column of individual filter cartridges. The filter moving device can be used to install a filter cartridge stack in a filter assembly, remove a filter cartridge stack from a filter assembly, or otherwise move and transport a filter cartridge stack. Of particular advantage, the filter moving device can easily, safely and effectively transport filter cartridge stacks with a minimal amount of manual effort and while protecting the individual cartridges from damage during lifting and moving.

In one embodiment, the filter cartridge stack contains individual filter cartridges in the shape of a disk. The individual filter cartridges may contain a filter media for filtering impurities, contaminants, and/or waste from a fluid, such as a gas or a liquid. Each filter cartridge may contain a single layer or multiple layers of filter media. These types of filter cartridges may be used to filter all different types of fluids. For example, the filter cartridges may be used to filter fluids in the food service industry or for use in water purification systems. These filters are particularly well suited for use in pharmaceutical applications. For example, the filters can be used to clarify cell culture harvest products or clarify bacteria, yeast, and cell lysates. The filter cartridges may also be used for host cell protein removal, for virus and DNA reduction, for protein aggregate removal, for endotoxin removal, and the like. During most applications, the filter cartridges are used to filter a liquid. Consequently, after use, the filter cartridges not only accumulate contaminates and waste, but also absorb significant amounts of liquids. Individual cartridges, for instance, can weigh in some applications greater than 10 kilograms. When a cartridge filter stack contains 20 cartridges, removal of each cartridge manually is not only time consuming but requires a significant amount of strength and dexterity. As will be described in greater detail below, however, the filter moving device of the present disclosure allows for the removal of an entire stack of cartridges with very minimum effort. In addition, workers and operators can handle and move filter cartridge stacks without directly contacting the cartridges.

Referring to FIG. 1, for instance, one embodiment of a filter removable device 10 made in accordance with the present disclosure is shown. The filter removable device 10 includes a frame 12 that can be made from various different materials. For example, the frame 12 can be made from any suitable high strength material, such as a metal or a high strength polymer. The metal, for instance, may comprise stainless steel, aluminum, an alloy, or the like.

As illustrated in FIG. 1, the frame 12 includes a first end 14 and a second and opposite end 16. The first end 14 comprises an open end leading to an interior space within the frame. The first end or open end 14 is designed to fit over a filter cartridge stack.

The frame 12 can be made from various different structural members. In the embodiment illustrated in FIG. 1, for instance, the frame includes a plurality of circular frame members 18 that are connected together by vertical frame members 20. The circular frame members 18 form a circumference for the frame. In the embodiment shown in FIG. 1, the frame includes 3 circular frame members 18. Two of the circular frame members are shown spaced closer together towards the bottom half of the frame. It should be understood, however, that the frame can include only 2 circular frame members or more than 3 circular frame members. In one embodiment, for instance, the frame can include from about 3 to about 8 circular frame members. The number of circular frame numbers may depend upon various factors including the height of the frame and the type of filters being supported within the frame.

The vertical frame members 20 as shown in FIG. 1 can be spaced equally around the circumference if desired. In the embodiment illustrated, the frame includes 4 vertical frame members 20. It should be understood, however, that the frame 12 may include more or less vertical frame members. Further, in addition to vertical frame members, the frame may include a cylindrical shell or baffle that more completely encloses filter cartridges within the interior space of the frame.

The second end or top end 16 of the frame 12 further includes a connector 22 for connecting the frame to a lift mechanism, such as a hoist. In the embodiment illustrated in FIG. 1, the connector 22 comprises a closed triangle that defines an opening for receiving a hook or other suitable device for lifting the frame. It should be understood, however, that any suitable connector may be incorporated into the frame 12 of the present disclosure.

In accordance with the present disclosure, the filter moving device 10 further includes a plurality of lifting elements 24. The lifting elements 24 are designed to mate with or otherwise engage a filter cartridge stack for lifting and moving the stack. In the embodiment illustrated, the lifting elements 24 comprise horizontal extensions that are configured to reside below individual filter cartridges for lifting a filter cartridge stack.

As shown in FIG. 1, in one embodiment, the lifting elements 24 are arranged in groups along the height of the filter moving device 10. In FIG. 1, for instance, each group comprises 3 lifting elements 24 that are spaced around the circumference or perimeter of the frame 12 and extend into the interior space of the frame. The lifting elements 24 that make up a group are all positioned at the same height on the frame 12 such that the lifting elements reside in a horizontal plane that is perpendicular to a vertical axis of the frame. In the embodiment illustrated in Figures, each group contains 3 lifting elements 24. It should be understood, however, that each group may contain a different number of lifting elements depending upon the particular application and various factors. For instance, each group may contain at least 2 lifting elements, such as least 3 lifting elements, such as at least 4 lifting elements, such as at least 5 lifting elements. In general, each group contains less than about 10 lifting elements, such as less than about 8 lifting elements, such as less than about 6 lifting elements. The lifting elements in a group can be equally spaced along the circumference or perimeter of the interior space of the frame 12 or may be spaced apart unequal distances around the circumference or perimeter. The locking elements 24, for instance, may be spaced unequal distances in order to accommodate different filter cartridges that may be contained in the filter cartridge stack.

Figure 3:
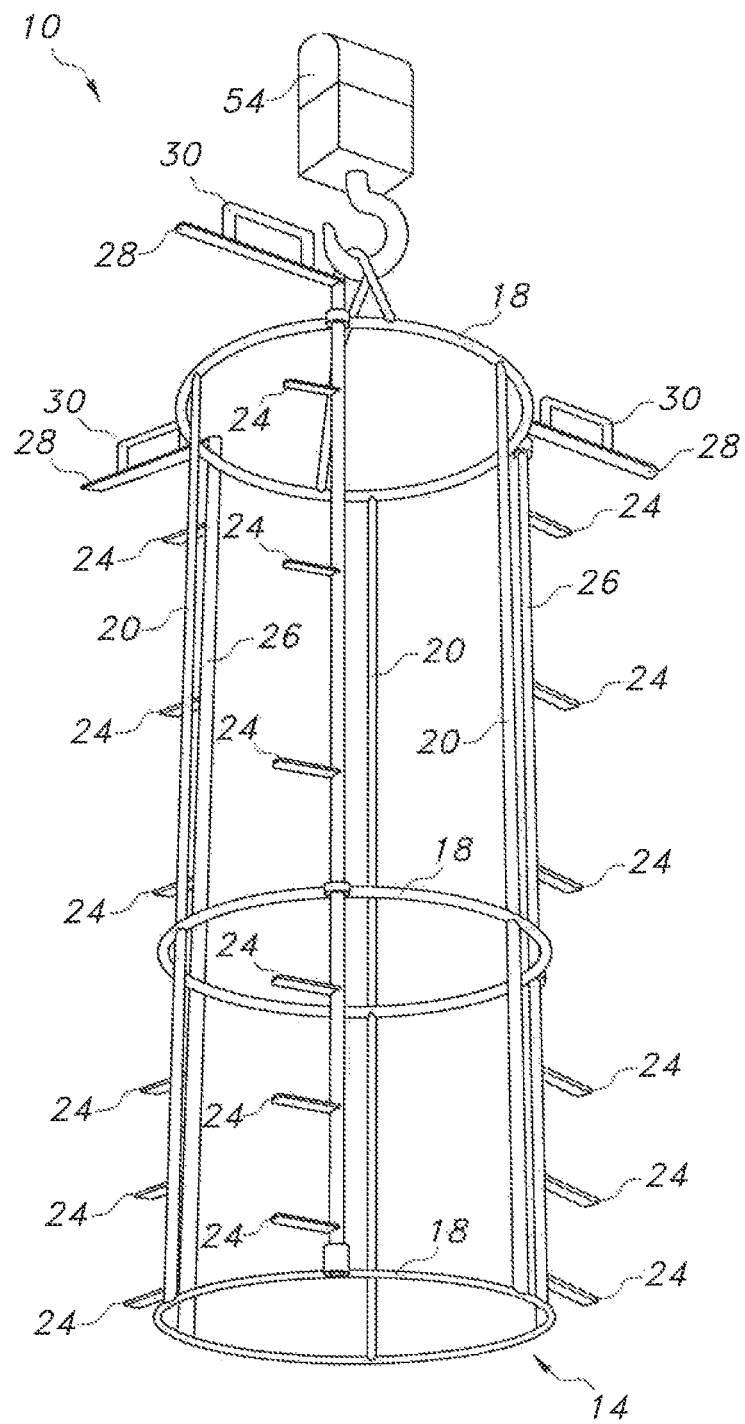
FIG. 3 is a perspective view of the filter moving device shown in FIG. 1 engaged with a lifting mechanism, such as a hoist.

The lifting elements 24, can extend directly from the frame 12 or, as shown in FIG. 1, can be attached to vertical rod members 26. The vertical rod members 26 are parallel with the vertical frame members 20 and organize the lifting elements 24 into vertical columns. In accordance with the present disclosure, the vertical rod members 26 are pivotably or rotatably attached to the frame 12. In this manner, pivoting the vertical rod member 26 causes the lifting elements 24 to move and also pivot. In this manner, the lifting elements 24 are movable between a cartridge engaging position as shown in FIG. 1 and a filter cartridge disengaging position as shown in FIG. 3.

In the embodiment illustrated in FIG. 1, the vertical rod members further include a cross member 28 located at a top end of the vertical rod member. The cross member 28 extends horizontally into the interior space of the frame 12. Each cross member 28 comprises a handle 30 that an operator may use in order to pivot or rotate the vertical rod members 26 and move the lifting elements between the engaging position and the disengaging position.

As shown, the lifting elements 24 are organized into horizontal groups at different heights on the frame 12 through the use of the vertical rod members 26. The filter moving device 10 generally contains at least 2 groups of lifting elements 24. For example, the filter moving device 10 can include at least 3 groups, such as at least 4 groups, such as at least 5 groups, such as at least 6 groups, such as at least 7 groups, such as at least 8 groups, such as at least 9 groups of lifting elements located at different heights on the frame 12. In general, the filter moving device contains less than about 20 groups of lifting elements, such as less than about 15 groups of lifting elements, such as less than about 12 groups of lifting elements, such as less than about 10 groups of lifting elements. In the embodiment illustrated in FIG. 1, the filter moving device 10 includes 6 horizontal groups of lifting elements 24.

The groups of lifting elements 24 can be spaced apart equally along the height of the frame 12 or, alternatively, can be spaced apart unequal distances. In one embodiment, for instance, the bottom portion of the frame 12 may include a greater density of groups of lifting elements in comparison to the top portion of the frame. Placing a greater number of groups of lifting elements 24 on the bottom portion of the frame may help to stabilize the frame when engaging a filter cartridge stack by providing more support to the bottom of the stack.

For example, referring to FIG. 3, the filter moving device 10 includes 3 groups of lifting elements 24 and two circular frame members 18 located within the bottom portion of the frame such as in the lower 40%, such as lower 35%, such as lower 33% of the height of the frame. The remaining height of the frame (top 60% to 65% of the height of the frame) also contains 3 groups of lifting members 24. In this manner, the groups of lifting elements 24 in the bottom portion are spaced more closely together than the groups of lifting elements 24 located in the top portion of the frame. It should be understood that the position and location of the lifting elements 24 illustrated in the figures represents only a single embodiment of the filter moving device and the spacing between the lifting elements can be varied depending upon the particular application.

As described above, the vertical rod members 26 can include a cross member 28 that horizontally extends across the interior space of the frame 12. In one embodiment, as shown in FIG. 1, the cross members 28 can overlap when the lifting elements 24 are in the filter cartridge engaging position. A locking mechanism 34 can be used to lock the vertical rod members 26 into position by engaging the cross members 28. In this manner, the lifting elements 24 are locked into the filter cartridge engaging position. Although any suitable locking mechanism may be used in accordance with the present disclosure, in the embodiment illustrated in FIG. 1, the locking mechanism includes a pin 34 that extends through a plurality of locking apertures 32 on the cross members 28. The locking apertures 32 are in alignment when the lifting elements 24 are in the filter cartridge engaging position. The pin 34 of the locking mechanism can be attached to a tether 36 that is in turn attached to the frame 12. The tether 36 is for preventing loss of the pin and for assisting an operator in placing the pin within the apertures.

One method for using the filter moving device 10 in order to lift and move a cartridge filter stack will now be described in greater detail with reference to FIGS. 2 through 7. The figures illustrate a process by which the filter moving device 10 is used to remove a filter cartridge stack from a filter assembly after use and to place the spent filter cartridge stack into a bag or container. It should be understood, however, that the filter moving device 10 can also be used to install a filter cartridge stack within a filter assembly or simply to move a cartridge filter stack from one location to another.

Figure 2:
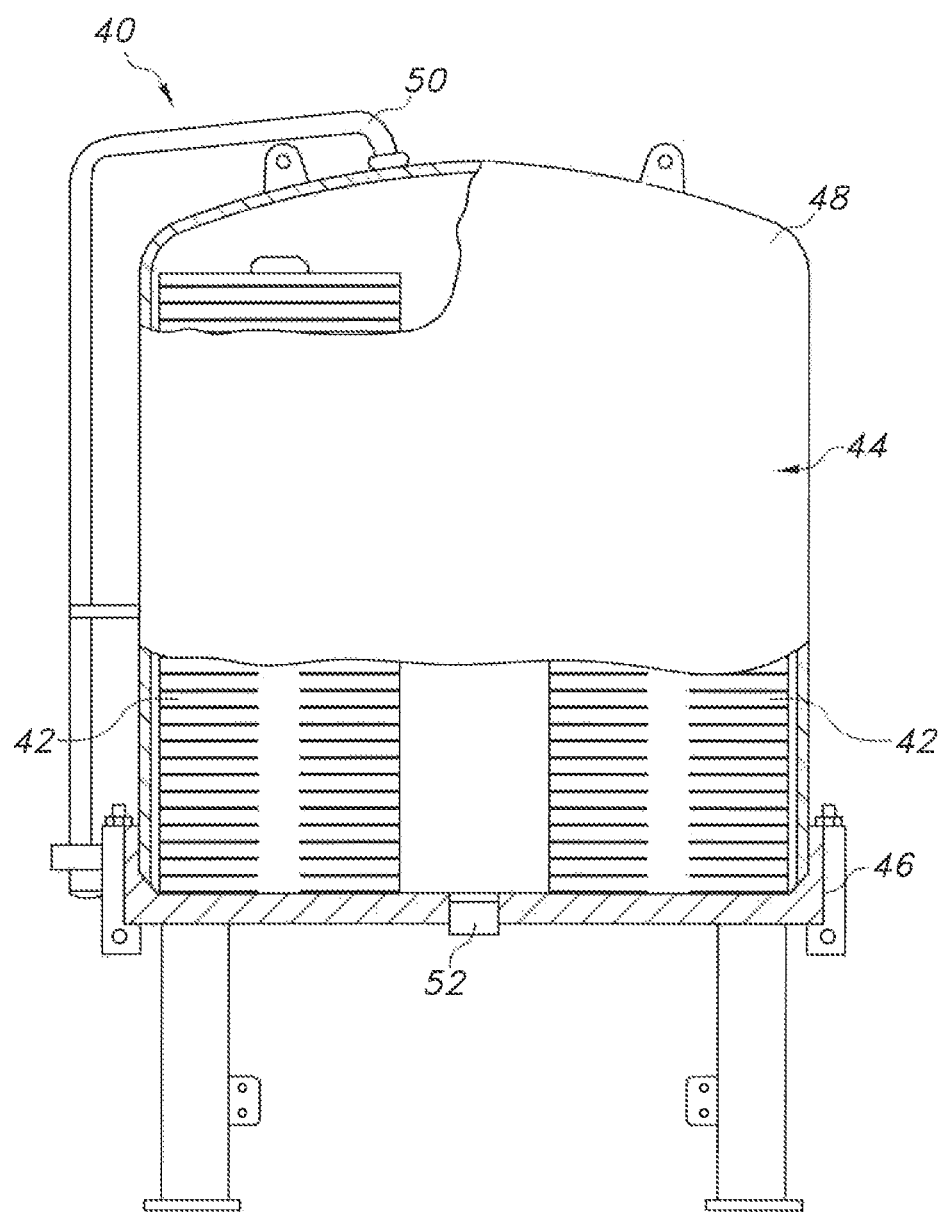
FIG. 2 is a side view with cut away portions illustrating an embodiment of a filter assembly.

Referring to FIG. 2, one embodiment of a filter assembly 40 that may be serviced in accordance with the present disclosure is shown. The filter assembly 40 contains a plurality of filter cartridge stacks 42. For instance, the filter assembly 40 may include from about 2 to about 5 stacks of filter cartridges 42. The filter assembly 40 is known in the art as a multi-round assembly. The filter moving device of the present disclosure, however, may also be used in conjunction with a filter assembly containing only a single stack of filter cartridges.

The filter assembly 40 includes a housing 44 attached to a base assembly 46. The housing 44 defines a hollow interior that encloses the one or more filter cartridge stacks 42 within the filter assembly 40. The housing 44 can be made from a single piece or can be divided into separate pieces that are attached together. The housing 44 and the base assembly 46 can be made from various different materials such as metal. In one embodiment, for instance, both the housing 44 and the base assembly 46 are made from stainless steel.

The housing 44 can include a closed dome end 48 and an opposite open end. The open end engages the base assembly 46. For instance, the base assembly can include a plurality of clamps that clamp the housing 44 to the base assembly 46 and form a fluid tight seal.

The filter assembly 40 further includes a fluid inlet 50 and a fluid outlet 52. For example, during normal operation, unfiltered product, such as a liquid or gas, is pumped into the filter assembly 40 through the fluid inlet 50. As the fluid is being filled into the housing 44, a valve is open to permit trapped air to escape. After the filter assembly 40 is filled with the unfiltered product, the value is closed and pressure builds within the system. The fluid pressure forces the unfiltered product into the one or more filtered cartridge stacks 42. The filter cartridges filter the fluid and remove waste, contaminates, or any other undesired components within the fluid. The filtrate or filtered product then travels down through the interior of the filter cartridge stack 42. Although not shown, the center of the filter cartridge stacks 42 is in fluid communication with the outlet 52. In this manner, the filtrate or filtered product can be collected from the fluid outlet 52.

Over time, the filter cartridge stacks 42 within the filter assembly 40 need to be removed and replaced with new filter cartridges. The filter cartridge stacks 42 can become very heavy, especially when filtering liquids. In order to remove the filter cartridge stacks 42, the housing 44 is detached from the base assembly 46 and removed. In accordance with the present disclosure, the filter moving device 10 can then be used to engage and lift the filter cartridge stacks 42 from the filter assembly 40.

For example, referring to FIG. 3, the filter moving device 10 is shown engaged by a lifting mechanism 54, such as a hoist. The vertical rod members 26 have been rotated using the handles 30 on the cross members 28. In particular, the filter moving device 10 is shown with the lifting elements 24 in the disengaging position such that they do not extend into the interior space of the frame 12.

Figure 4:
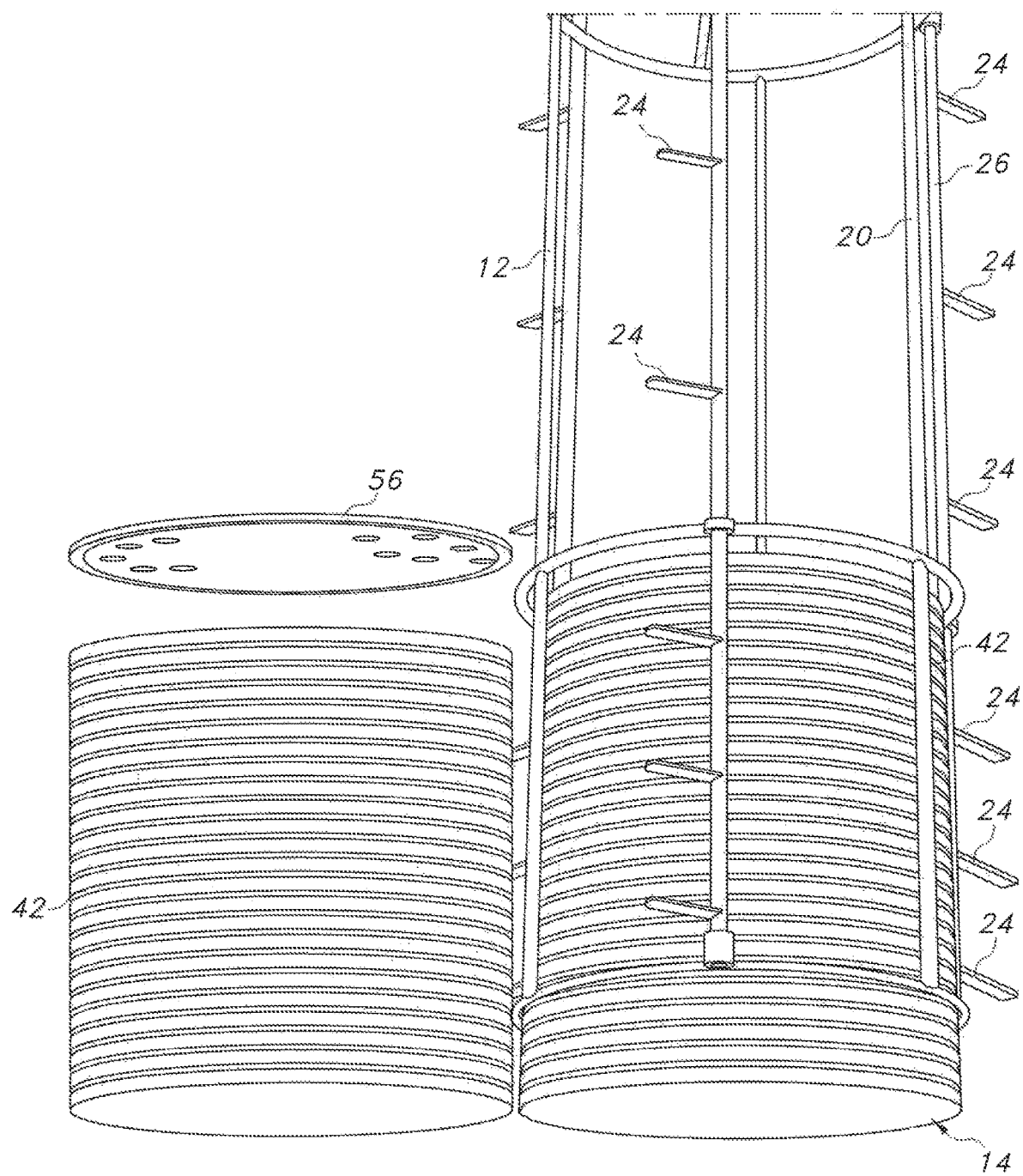
FIG. 4 is a perspective view of the filter moving device illustrated in FIG. 1 being placed over a cartridge filter stack contained in a filter assembly.

In the position illustrated in FIG. 3, the filter moving device 10 is guided over a filter cartridge stack 42 as shown in FIG. 4. Prior to placing the filter moving device 10 over the filter cartridge stack 42, a retaining ring 56 is removed from the cartridge filter stack so that the individual cartridges can be released from the filter assembly. As shown in FIG. 4, the open end 14 of the frame 12 is placed over the filter cartridge stack 42. The lifting mechanism as shown in FIG. 3 is used to lower the filter moving device 10 over the stack of filter cartridges. As shown in FIG. 4, the lifting elements 24 remain in the disengaging position.

Figure 5:
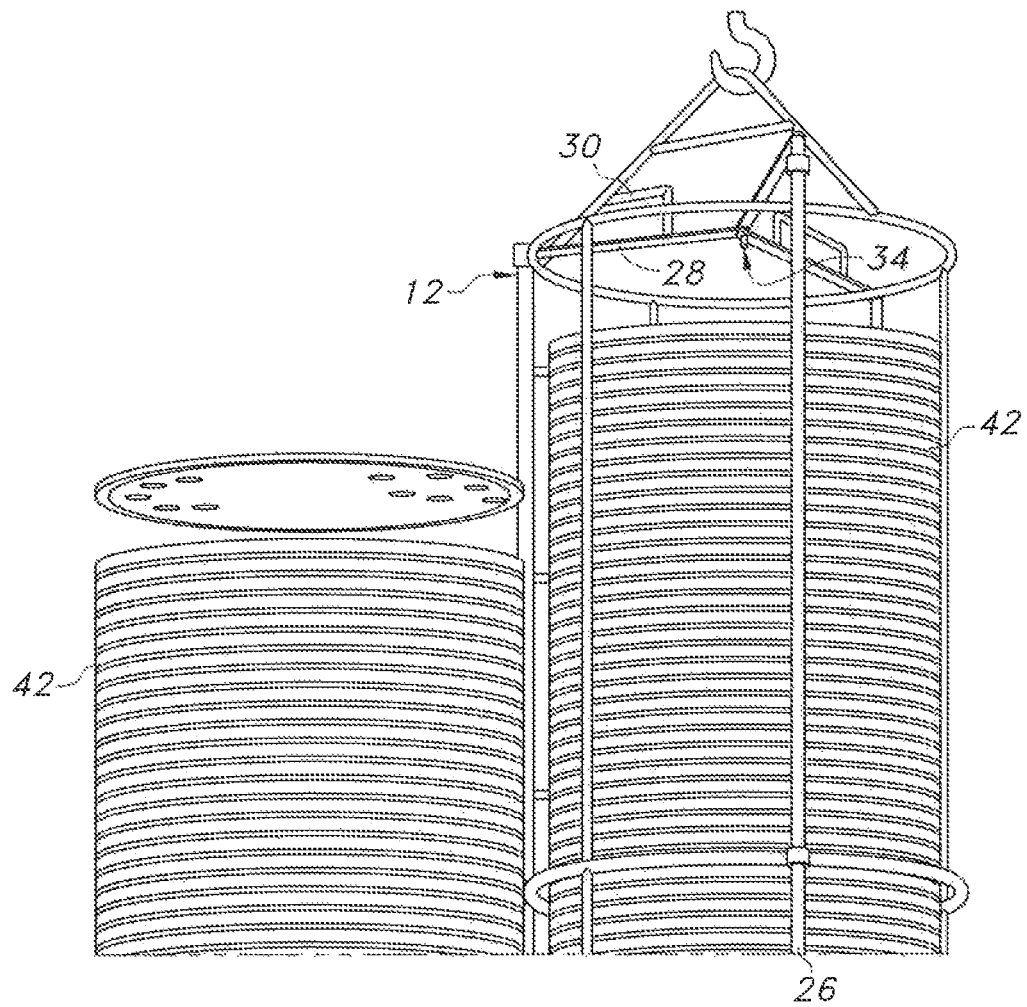
FIG. 5 is a perspective view of the filter moving device illustrated in FIG. 1 shown engaging a cartridge filter stack.

Referring to FIG. 5, once the filter moving device 10 is placed substantially over the filter cartridge stack 42, an operator can rotate the vertical rod members 26 using the handles 30 on the cross members 28. In this manner, the lifting elements are moved from the disengaging position to the engaging position where they are positioned below an individual filter cartridge. Once the cross members 28 are rotated, the cross members overlap and the locking apertures 32 become aligned. In this manner, the locking mechanism 34 can be placed within the locking apertures for locking the lifting elements into the engaging position.

Figure 6:
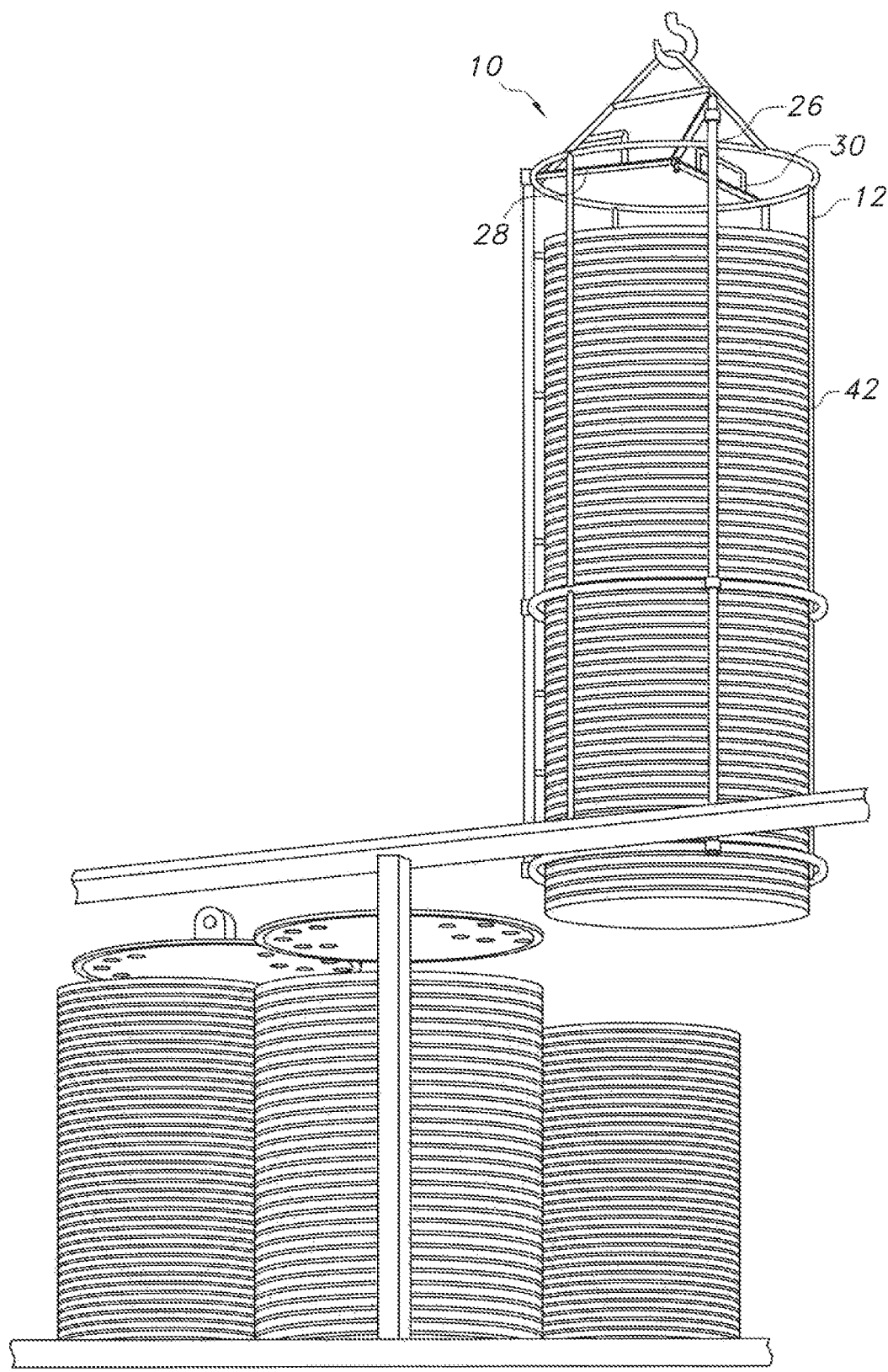
FIG. 6 is a perspective view of the filter moving device illustrated in FIG. 1 shown engaged with and being lifted with a filter cartridge stack.

The lifting mechanism or hoist is then used to lift the filter moving device 10 which is completely engaged and attached to the filter cartridge stack 42. Thus, the entire filter cartridge stack 42 can be lifted and removed from the filter assembly as shown in FIG. 6.

Figure 7:
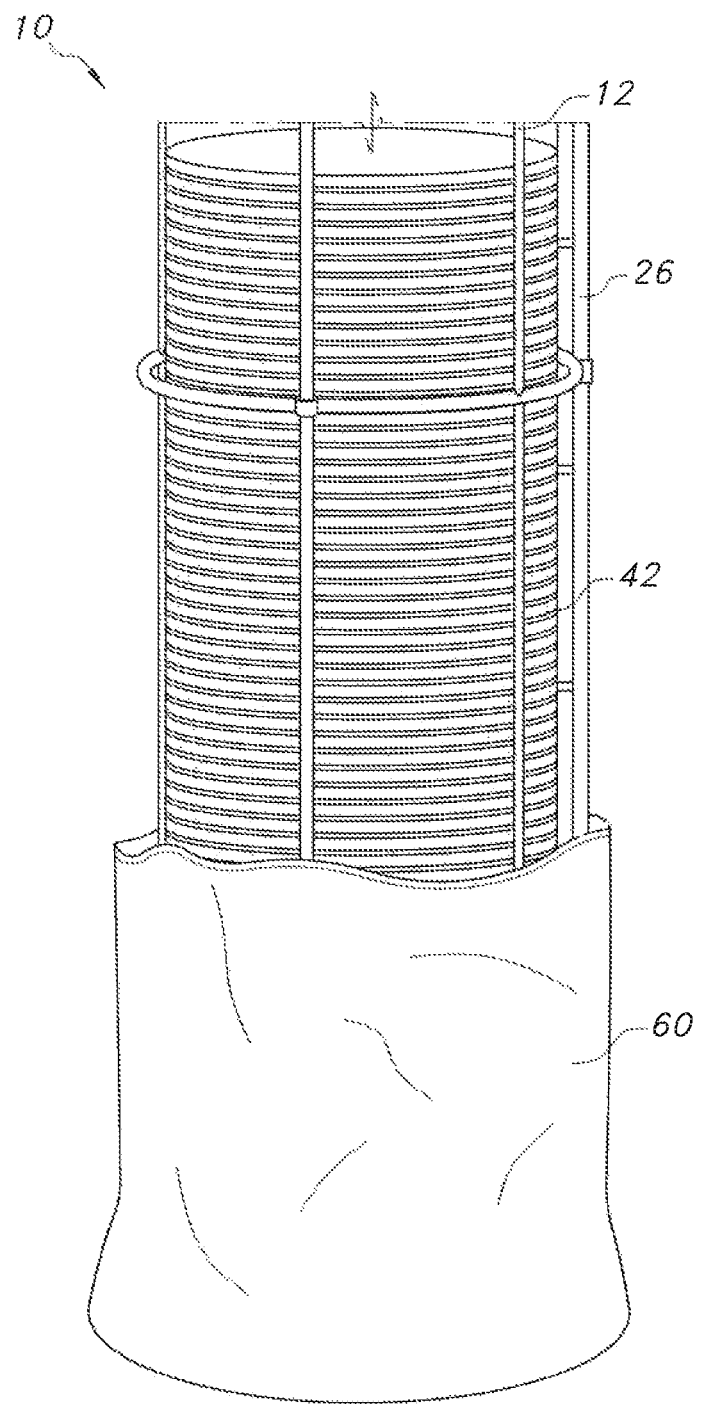
FIG. 7 is a perspective view of the filter moving device illustrated in FIG. 1 being shown holding a cartridge filter stack and be lowered into a container for transferring the cartridge filter stack into the container.

Once the filter cartridge stack 42 is removed from the filter assembly, the filter cartridge stack can be moved or transported to any desired location. In one embodiment, as shown in FIG. 7, the filter moving device 10 can be used to guide the filter cartridge stack 42 into a container or bag 60 for transporting the filter cartridges off site in order to dispose of the filter cartridges and/or to recycle the filter cartridges. Once the filter cartridge stack 42 is lowered into the bag 60, the locking elements 24 can be moved to the disengaging position for releasing the filter cartridges into the container.

The filter assembly and the filter cartridge stacks serviced in accordance with the present disclosure can be used in numerous and diverse applications. In one embodiment, for instance, the filter assembly can be used to filter fluids, such as liquids, during the culturing of cells, including prokaryotic and/or eukaryotic cell lines. Further, in embodiments, the devices, facilities and methods are suitable for filtering fluids during the culturing of suspension cells or anchorage-dependent (adherent) cells and are suitable for production operations configured for production of pharmaceutical and biopharmaceutical products-such as polypeptide products, nucleic acid products (for example DNA or RNA), or cells and/or viruses such as those used in cellular and/or viral therapies.

In embodiments, the cells express or produce a product, such as a recombinant therapeutic or diagnostic product. As described in more detail below, examples of products produced by cells include, but are not limited to, antibody molecules (e.g., monoclonal antibodies, bispecific antibodies), antibody mimetics (polypeptide molecules that bind specifically to antigens but that are not structurally related to antibodies such as e.g. DARPins, affibodies, adnectins, or IgNARs), fusion proteins (e.g., Fc fusion proteins, chimeric cytokines), other recombinant proteins (e.g., glycosylated proteins, enzymes, hormones), viral therapeutics (e.g., anti-cancer oncolytic viruses, viral vectors for gene therapy and viral immunotherapy), cell therapeutics (e.g., pluripotent stem cells, mesenchymal stem cells and adult stem cells), vaccines or lipid-encapsulated particles (e.g., exosomes, virus-like particles), RNA (such as e.g. siRNA) or DNA (such as e.g. plasmid DNA), antibiotics or amino acids. In embodiments, the devices, facilities and methods can be used for producing biosimilars.

As mentioned, in embodiments, devices, facilities and methods allow for the production of eukaryotic cells, e.g., mammalian cells or lower eukaryotic cells such as for example yeast cells or filamentous fungi cells, or prokaryotic cells such as Gram-positive or Gram-negative cells and/or products of the eukaryotic or prokaryotic cells, e.g., proteins, peptides, antibiotics, amino acids, nucleic acids (such as DNA or RNA), synthesised by the eukaryotic cells in a large-scale manner. Unless stated otherwise herein, the devices, facilities, and methods can include any desired volume or production capacity including but not limited to bench-scale, pilot-scale, and full production scale capacities.

Moreover and unless stated otherwise herein, the devices, facilities, and methods can include any suitable reactor(s) including but not limited to stirred tank, airlift, fiber, microfiber, hollow fiber, ceramic matrix, fluidized bed, fixed bed, and/or spouted bed bioreactors. As used herein, "reactor" can include a fermentor or fermentation unit, or any other reaction vessel and the term "reactor" is used interchangeably with "fermentor." For example, in some aspects, an example bioreactor unit can perform one or more, or all, of the following: feeding of nutrients and/or carbon sources, injection of suitable gas (e.g., oxygen), inlet and outlet flow of fermentation or cell culture medium, separation of gas and liquid phases, maintenance of temperature, maintenance of oxygen and C02 levels, maintenance of pH level, agitation (e.g., stirring), and/or cleaning/sterilizing. Example reactor units, such as a fermentation unit, may contain multiple reactors within the unit, for example the unit can have 1, 2, 3, 4, 5, 10, 15, 20, 25, 30, 35, 40, 45, 50, 60, 70, 80, 90, or 100, or more bioreactors in each unit and/or a facility may contain multiple units having a single or multiple reactors within the facility. In various embodiments, the bioreactor can be suitable for batch, semi fed-batch, fed-batch, perfusion, and/or a continuous fermentation processes. Any suitable reactor diameter can be used. In embodiments, the bioreactor can have a volume between about 100 mL and about 50,000 L. Non-limiting examples include a volume of 100 mL, 250 mL, 500 mL, 750 mL, 1 liter, 2 liters, 3 liters, 4 liters, 5 liters, 6 liters, 7 liters, 8 liters, 9 liters, 10 liters, 15 liters, 20 liters, 25 liters, 30 liters, 40 liters, 50 liters, 60 liters, 70 liters, 80 liters, 90 liters, 100 liters, 150 liters, 200 liters, 250 liters, 300 liters, 350 liters, 400 liters, 450 liters, 500 liters, 550 liters, 600 liters, 650 liters, 700 liters, 750 liters, 800 liters, 850 liters, 900 liters, 950 liters, 1000 liters, 1500 liters, 2000 liters, 2500 liters, 3000 liters, 3500 liters, 4000 liters, 4500 liters, 5000 liters, 6000 liters, 7000 liters, 8000 liters, 9000 liters, 10,000 liters, 15,000 liters, 20,000 liters, and/or 50,000 liters. Additionally, suitable reactors can be multi-use, single-use, disposable, or non-disposable and can be formed of any suitable material including metal alloys such as stainless steel (e.g., 316L or any other suitable stainless steel) and Inconel, plastics, and/or glass.

In embodiments and unless stated otherwise herein, the devices, facilities, and methods described herein can also include any suitable unit operation and/or equipment not otherwise mentioned, such as operations and/or equipment for separation, purification, and isolation of such products. Any suitable facility and environment can be used, such as traditional stick-built facilities, modular, mobile and temporary facilities, or any other suitable construction, facility, and/or layout. For example, in some embodiments modular clean-rooms can be used. Additionally and unless otherwise stated, the devices, systems, and methods described herein can be housed and/or performed in a single location or facility or alternatively be housed and/or performed at separate or multiple locations and/or facilities.

By way of non-limiting examples and without limitation, U.S. Publication Nos. 2013/0280797; 2012/0077429; 2011/

0280797; 2009/0305626; and U.S. Pat. Nos. 8,298,054; 7,629,167; and 5,656,491, which are hereby incorporated by reference in their entirety, describe example facilities, equipment, and/or systems that may be suitable.

In embodiments, the cells are eukaryotic cells, e.g., mammalian cells. The mammalian cells can be for example human or rodent or bovine cell lines or cell strains. Examples of such cells, cell lines or cell strains are e.g. mouse myeloma (NSO)-cell lines, Chinese hamster ovary (CHO)-cell lines, HT1080, H9, HepG2, MCF7, MDBK Jurkat, NIH3T3, PC12, BHK (baby hamster kidney cell), VERO, SP2/0, YB2/0, Y0, C127, L cell, COS, e.g., COS1 and COS7, QC1-3,HEK-293, VERO, PER.C6, HeLA, EBI, EB2, EB3, oncolytic or hybridoma-cell lines. Preferably the mammalian cells are CHO-cell lines. In one embodiment, the cell is a CHO cell. In one embodiment, the cell is a CHO-K1 cell, a CHO-K1 SV cell, a DG44 CHO cell, a DUXB11 CHO cell, a CHOS, a CHO GS knock-out cell, a CHO FUT8 GS knock-out cell, a CHOZN, or a CHO-derived cell. The CHO GS knock-out cell (e.g., GSKO cell) is, for example, a CHO-K1 SV GS knockout cell. The CHO FUT8 knockout cell is, for example, the Potelligent® CHOK1 SV (Lonza Biologics, Inc.). Eukaryotic cells can also be avian cells, cell lines or cell strains, such as for example, EBx® cells, EB14, EB24, EB26, EB66, or EBvl3.

In one embodiment, the eukaryotic cells are stem cells. The stem cells can be, for example, pluripotent stem cells, including embryonic stem cells (ESCs), adult stem cells, induced pluripotent stem cells (iPSCs), tissue specific stem cells (e.g., hematopoietic stem cells) and mesenchymal stem cells (MSCs).

In one embodiment, the cell is a differentiated form of any of the cells described herein. In one embodiment, the cell is a cell derived from any primary cell in culture.

In embodiments, the cell is a hepatocyte such as a human hepatocyte, animal hepatocyte, or a non-parenchymal cell. For example, the cell can be a plateable metabolism qualified human hepatocyte, a plateable induction qualified human hepatocyte, plateable Qualyst Transporter Certified™ human hepatocyte, suspension qualified human hepatocyte (including 10-donor and 20-donor pooled hepatocytes), human hepatic kupffer cells, human hepatic stellate cells, dog hepatocytes (including single and pooled Beagle hepatocytes), mouse hepatocytes (including CD-1 and C57Bl/6 hepatocytes), rat hepatocytes (including Sprague-Dawley, Wistar Han, and Wistar hepatocytes), monkey hepatocytes (including Cynomolgus or Rhesus monkey hepatocytes), cat hepatocytes (including Domestic Shorthair hepatocytes), and rabbit hepatocytes (including New Zealand White hepatocytes). Example hepatocytes are commercially available from Triangle Research Labs, LLC, 6 Davis Drive Research Triangle Park, N.C., USA 27709.

In one embodiment, the eukaryotic cell is a lower eukaryotic cell such as e.g. a yeast cell (e.g., *Pichia* genus (e.g. *Pichia pastoris, Pichia methanolica, Pichia kluyveri,* and *Pichia angusta*), *Komagataella* genus (e.g. *Komagataella pastoris, Komagataella pseudopastoris* or *Komagataella phaffii*), *Saccharomyces* genus (e.g. *Saccharomyces cerevisae, cerevisiae, Saccharomyces kluyveri, Saccharomyces uvarum*), *Kluyveromyces* genus (e.g. *Kluyveromyces lactis, Kluyveromyces marxianus*), the *Candida* genus (e.g. *Candida utilis, Candida cacaoi, Candida boidinii,*), the *Geotrichum* genus (e.g. *Geotrichum fermentans*), *Hansenula polymorpha, Yarrowia lipolytica,* or *Schizosaccharomyces pombe*. Preferred is the species *Pichia pastoris*. Examples for *Pichia pastoris* strains are X33, GS115, KM71, KM71H; and CBS7435.

In one embodiment, the eukaryotic cell is a fungal cell (e.g. *Aspergillus* (such as *A. niger, A. fumigatus, A. orzyae, A. nidula*), *Acremonium* (such as *A. thermophilum*), *Chaetomium* (such as *C. thermophilum*), *Chrysosporium* (such as *C. thermophile*), *Cordyceps* (such as *C. militaris*), *Corynascus, Ctenomyces, Fusarium* (such as *F. oxysporum*), *Glomerella* (such as *G. graminicola*), *Hypocrea* (such as *H. jecorina*), *Magnaporthe* (such as *M. orzyae*), *Myceliophthora* (such as *M. thermophile*), *Nectria* (such as *N. heamatococca*), *Neurospora* (such as *N. crassa*), *Penicillium, Sporotrichum* (such as *S. thermophile*), *Thielavia* (such as *T. terrestris, T. heterothallica*), *Trichoderma* (such as *T. reesei*), or *Verticillium* (such as *V. dahlia*)).

In one embodiment, the eukaryotic cell is an insect cell (e.g., Sf9, Mimic™ Sf9, Sf21, High Fiven (BT1-TN-5B1-4), or BT1-Ea88 cells), an algae cell (e.g., of the genus *Amphora, Bacillariophyceae, Dunaliella, Chlorella, Chlamydomonas, Cyanophyta* (cyanobacteria), *Nannochloropsis, Spirulina,* or *Ochromonas*), or a plant cell (e.g., cells from monocotyledonous plants (e.g., maize, rice, wheat, or *Setaria*), or from a dicotyledonous plants (e.g., cassava, potato, soybean, tomato, tobacco, alfalfa, *Physcomitrella patens* or *Arabidopsis*).

In one embodiment, the cell is a bacterial or prokaryotic cell.

In embodiments, the prokaryotic cell is a Gram-positive cells such as *Bacillus, Streptomyces Streptococcus, Staphylococcus* or *Lactobacillus. Bacillus* that can be used is, e.g. the *B. subtilis, B. amyloliquefaciens, B. licheniformis, B. natto,* or *B. megaterium*. In embodiments, the cell is *B. subtilis,* such as *B. subtilis* 3NA and *B. subtilis* 168. *Bacillus* is obtainable from, e.g., the *Bacillus* Genetic Stock Center, Biological Sciences 556, 484 West 12$^{th}$ Avenue, Columbus Ohio 43210-1214.

In one embodiment, the prokaryotic cell is a Gram-negative cell, such as *Salmonella* spp. or *Escherichia coli*, such as e.g., TG1, TG2, W3110, DH1, DHB4, DH5a, HMS 174, HMS174 (DE3), NM533, C600, HB101, JM109, MC4100, XL1-Blue and Origami, as well as those derived from *E. coli* B-strains, such as for example BL-21 or BL21 (DE3), all of which are commercially available.

Suitable host cells are commercially available, for example, from culture collections such as the DSMZ (Deutsche Sammlung von Mikroorganismen and Zellkulturen GmbH, Braunschweig, Germany) or the American Type Culture Collection (ATCC).

In embodiments, the cultured cells are used to produce proteins e.g., antibodies, e.g., monoclonal antibodies, and/or recombinant proteins, for therapeutic use. In embodiments, the cultured cells produce peptides, amino acids, fatty acids or other useful biochemical intermediates or metabolites. For example, in embodiments, molecules having a molecular weight of about 4000 daltons to greater than about 140,000 daltons can be produced. In embodiments, these molecules can have a range of complexity and can include posttranslational modifications including glycosylation.

In embodiments, the protein is, e.g., BOTOX, Myobloc, Neurobloc, Dysport (or other serotypes of botulinum neurotoxins), alglucosidase alpha, daptomycin, YH-16, choriogonadotropin alpha, filgrastim, cetrorelix, interleukin-2, aldesleukin, teceleulin, denileukin diftitox, interferon alpha-n3 (injection), interferon alpha-nI, DL-8234, interferon, Suntory (gamma-1a), interferon gamma, thymosin alpha 1, tasonermin, DigiFab, ViperaTAb, EchiTAb, CroFab, nesiritide, abatacept, alefacept, Rebif, eptoterminalfa, teriparatide (osteoporosis), calcitonin injectable (bone disease), calcitonin (nasal, osteoporosis), etanercept, hemoglobin glutamer 250 (bovine), drotrecogin alpha, collagenase, carperitide, recombinant human epidermal growth factor (topical gel, wound healing), DWP401, darbepoetin alpha, epoetin omega, epoetin beta, epoetin alpha, desirudin, lepirudin, bivalirudin, nonacog alpha, Mononine, eptacog alpha (activated), recombinant Factor VIII+VWF, Recombinate, recombinant Factor VIII, Factor VIII (recombinant), Alphnmate, octocog alpha, Factor VIII, palifermin, lndikinase, tenecteplase, alteplase, pamiteplase, reteplase, nateplase, monteplase, follitropin alpha, rFSH, hpFSH, micafungin, pegfilgrastim, lenograstim, nartograstim, sermorelin, glucagon, exenatide, pramlintide, iniglucerase, galsulfase, Leucotropin, molgramostirn, triptorelin acetate, histrelin (subcutaneous implant, Hydron), deslorelin, histrelin, nafarelin, leuprolide sustained release depot (ATRIGEL), leuprolide implant (DUROS), goserelin, Eutropin, KP-102 program, somatropin, mecasermin (growth failure), enlfavirtide, Org-33408, insulin glargine, insulin glulisine, insulin (inhaled), insulin lispro, insulin deternir, insulin (buccal, RapidMist), mecasermin rinfabate, anakinra, celmoleukin, 99 mTc-apcitide injection, myelopid, Betaseron, glatiramer acetate, Gepon, sargramostim, oprelvekin, human leukocyte-derived alpha interferons, Bilive, insulin (recombinant), recombinant human insulin, insulin aspart, mecasenin, Roferon-A, interferon-alpha 2, Alfaferone, interferon alfacon-1, interferon alpha, Avonex' recombinant human luteinizing hormone, domase alpha, trafermin, ziconotide, taltirelin, diboterminalfa, atosiban, becaplermin, eptifibatide, Zemaira, CTC-111, Shanvac-B, HPV vaccine (quadrivalent), octreotide, lanreotide, ancestim, agalsidase beta, agalsidase alpha, laronidase, prezatide copper acetate (topical gel), rasburicase, ranibizumab, Actimmune, PEG-Intron, Tricomin, recombinant house dust mite allergy desensitization injection, recombinant human parathyroid hormone (PTH) 1-84 (sc, osteoporosis), epoetin delta, transgenic antithrombin III, Granditropin, Vitrase, recombinant insulin, interferon-alpha (oral lozenge), GEM-21S, vapreotide, idursulfase, omnapatrilat, recombinant serum albumin, certolizumab pegol, glucarpidase, human recombinant C1 esterase inhibitor (angioedema), lanoteplase, recombinant human growth hormone, enfuvirtide (needle-free injection, Biojector 2000), VGV-1, interferon (alpha), lucinactant, aviptadil (inhaled, pulmonary disease), icatibant, ecallantide, omiganan, Aurograb, pexigananacetate, ADI-PEG-20, LDI-200, degarelix, cintredelinbesudotox, Favld, MDX-1379, ISAtx-247, liraglutide, teriparatide (osteoporosis), tifacogin, AA4500, T4N5 liposome lotion, catumaxomab, DWP413, ART-123, Chrysalin, desmoteplase, amediplase, corifollitropinalpha, TH-9507, teduglutide, Diamyd, DWP-412, growth hormone (sustained release injection), recombinant G-CSF, insulin (inhaled, AIR), insulin (inhaled, Technosphere), insulin (inhaled, AERx), RGN-303, DiaPep277, interferon beta (hepatitis C viral infection (HCV)), interferon alpha-n3 (oral), belatacept, transdermal insulin patches, AMG-531, MBP-8298, Xerecept, opebacan, AIDSVAX, GV-1001, LymphoScan, ranpimase, Lipoxysan, lusupultide, MP52 (beta-tricalciumphosphate carrier, bone regeneration), melanoma vaccine, sipuleucel-T, CTP-37, Insegia, vitespen, human thrombin (frozen, surgical bleeding), thrombin, TransMID, alfimeprase, Puricase, terlipressin (intravenous, hepatorenal syndrome), EUR-1008M, recombinant FGF-I (injectable, vascular disease), BDM-E, rotigaptide, ETC-216, P-113, MBI-594AN, duramycin (inhaled, cystic fibrosis), SCV-07, OPI-45, Endostatin, Angiostatin, ABT-510, Bowman Birk Inhibitor Concentrate, XMP-629, 99 mTc-Hynic-Annexin V, kahalalide F, CTCE-9908, teverelix (extended release), ozarelix, romidepsin, BAY-504798, interleukin4, PRX-321, Pepscan, iboctadekin, rhlactoferrin, TRU-015, IL-21, ATN-161, cilengitide, Albuferon, Biphasix, IRX-2, omega interferon, PCK-3145, CAP-232, pasireotide, huN901-DMI, ovarian cancer immunotherapeutic vaccine, SB-249553, Oncovax-CL, OncoVax-P, BLP-25, CerVax-16, multi-epitope peptide melanoma vaccine (MART-1, gp100, tyrosinase), nemifitide, rAAT (inhaled), rAAT (dermatological), CGRP (inhaled, asthma), pegsunercept, thymosinbeta4, plitidepsin, GTP-200, ramoplanin, GRASPA, OBI-1, AC-100, salmon calcitonin (oral, eligen), calcitonin (oral, osteoporosis), examorelin, capromorelin, Cardeva, velafermin, 1311-TM-601, KK-220, T-10, ularitide, depelestat, hematide, Chrysalin (topical), rNAPc2, recombinant Factor V111 (PEGylated liposomal), bFGF, PEGylated recombinant staphylokinase variant, V-10153, SonoLysis Prolyse, NeuroVax, CZEN-002, islet cell neogenesis therapy, rGLP-1, BIM-51077, LY-548806, exenatide (controlled release, Medisorb), AVE-0010, GA-GCB, avorelin, ACM-9604, linaclotid eacetate, CETi-1, Hemospan, VAL (injectable), fast-acting insulin (injectable, Viadel), intranasal insulin, insulin (inhaled), insulin (oral, eligen), recombinant methionyl human leptin, pitrakinra subcutancous injection, eczema), pitrakinra (inhaled dry powder, asthma), Multikine, RG-1068, MM-093, NBI-6024, AT-001, PI-0824, Org-39141, Cpn10 (autoimmune diseases/inflammation), talactoferrin (topical), rEV-131 (ophthalmic), rEV-131 (respiratory disease), oral recombinant human insulin (diabetes), RPI-78M, oprelvekin (oral), CYT-99007 CTLA4-Ig, DTY-001, valategrast, interferon alpha-n3 (topical), IRX-3, RDP-58, Tauferon, bile salt stimulated lipase, Merispase, alaline phosphatase, EP-2104R, Melanotan-Ill, bremelanotide, ATL-104, recombinant human microplasmin, AX-200, SEMAX, ACV-1, Xen-2174, CJC-1008, dynorphin A, SI-6603, LAB GHRH, AER-002, BGC-728, malaria vaccine (virosomes, PeviPRO), ALTU-135, parvovirus B19 vaccine, influenza vaccine (recombinant neuraminidase), malaria/HBV vaccine, anthrax vaccine, Vacc-5q, Vacc-4x, HIV vaccine (oral), HPV vaccine, Tat Toxoid, YSPSL, CHS-13340, PTH(1-34) liposomal cream (Novasome), Ostabolin-C, PTH analog (topical, psoriasis), MBRI-93.02, MTB72F vaccine (tuberculosis), MVA-Ag85A vaccine (tuberculosis), FARA04, BA-210, recombinant plague FIV vaccine, AG-702, OxSODrol, rBetV1, Der-p1/Der-p2/Der-p7 allergen-targeting vaccine (dust mite allergy), PR1 peptide vaccine (leukemia), mutant ras vaccine, HPV-16 E7 lipopeptide vaccine, labyrinthin vaccine (adenocarcinoma), CML vaccine, WT1-peptide vaccine (cancer), IDD-5, CDX-110, Pentrys, Norelin, CytoFab, P-9808, VT-111, icrocaptide, telbermin (dermatological, diabetic foot ulcer), rupintrivir, reticulose, rGRF, HA, alpha-galactosidase A, ACE-011, ALTU-140, CGX-1160, angiotensin therapeutic vaccine, D-4F, ETC-642, APP-018, rhMBL, SCV-07 (oral, tuberculosis), DRF-7295, ABT-828, ErbB2-specific immunotoxin (anticancer), DT3SSIL-3, TST-10088, PRO-1762, Combotox, cholecystokinin-B/gastrin-receptor binding peptides, 111n-hEGF, AE-37, trasnizumab-DM1, Antagonist G, IL-12 (recombinant), PM-02734, IMP-321, rhIGF-BP3, BLX-883, CUV-1647 (topical), L-19 based radioimmunotherapeutics (cancer), Re-188-P-2045, AMG-386, DC/1540/KLH vaccine (cancer), VX-001, AVE-9633, AC-9301, NY-ESO-1 vaccine (peptides), NA17.A2 peptides, melanoma vaccine (pulsed antigen therapeutic), prostate cancer vaccine, CBP-501, recombinant human lactoferrin (dry eye), FX-06, AP-214, WAP-8294A (injectable), ACP-HIP, SUN-11031, peptide YY [3-36](obesity, intranasal), FGLL, atacicept, BR3-Fc, BN-003, BA-058, human parathyroid hormone 1-34 (nasal, osteoporosis), F-18-CCR1, AT-1100 (celiac disease/diabetes), JPD-003, PTH(7-34) liposomal cream (Novasome), duramycin (ophthalmic, dry eye), CAB-2, CTCE-0214, GlycoPEGylated erythropoietin, EPO-Fc, CNTO-528, AMG-114, JR-013, Factor XIII, aminocandin, PN-951, 716155, SUN-E7001, TH-0318, BAY-73-7977, teverelix (immediate release), EP-51216, hGH (controlled release, Biosphere), OGP-I, sifuvirtide, TV4710, ALG-889, Org-41259, rhCC10, F-991, thymopentin (pulmonary diseases), r(m)CRP, hepatoselective insulin, subalin, L19-IL-2 fusion protein, elafin, NMK-150, ALTU-139, EN-122004, rhTPO, thrombopoietin receptor agonist (thrombocytopenic disorders), AL-108, AL-208, nerve growth factor antagonists (pain), SLV-317, CGX-1007, INNO-105, oral teriparatide (eligen), GEM-OS1, AC-162352, PRX-302, LFn-p24 fusion vaccine (Therapore), EP-1043, *S. pneumoniae* pediatric vaccine, malaria vaccine, *Neisseria meningitidis* Group B vaccine, neonatal group B streptococcal vaccine, anthrax vaccine, HCV vaccine (gpE1+gpE2+MF-59), otitis media therapy, HCV vaccine (core antigen+ISCOMATRIX), hPTH(1-34) (transdermal, ViaDerm), 768974, SYN-101, PGN-0052, aviscumnine, BIM-23190, tuberculosis vaccine, multi-epitope tyrosinase peptide, cancer vaccine, enkastim, APC-8024, GI-5005, ACC-001, TTS-CD3, vascular-targeted TNF (solid tumors), desmopressin (buccal controlled-release), onercept, and TP-9201.

In some embodiments, the polypeptide is adalimumab (HUMIRA), infliximab (REMICADE™), rituximab (RITUXAN™/MAB THERA™) etanercept (ENBREL™), bevacizumab (AVASTIN™), trastuzumab (HERCEPTIN™), pegrilgrastim (NEULASTA™), or any other suitable polypeptide including biosimilars and biobetters.

Other suitable polypeptides are those listed below and in Table 1 of US2016/0097074:

TABLE I

| Protein Product | Reference Listed Drug |
| --- | --- |
| interferon gamma-1b | Actimmune ® |
| alteplase; tissue plasminogen activator | Activase ®/Cathflo ® |
| Recombinant antihemophilic factor | Advate |
| human albumin | Albutein ® |
| Laronidase | Aldurazyme ® |
| Interferon alfa-N3, human leukocyte derived | Alferon N ® |
| human antihemophilic factor | Alphanate ® |
| virus-filtered human coagulation factor IX | AlphaNine ® SD |
| Alefacept; recombinant, dimeric fusion protein LFA3-Ig | Amevive ® |
| Bivalirudin | Angiomax ® |
| darbepoetin alfa | Aranesp ™ |
| Bevacizumab | Avastin ™ |
| interferon beta-1a; recombinant | Avonex ® |
| coagulation factor IX | BeneFix ™ |
| Interferon beta-1b | Betaseron ® |
| Tositumomab | BEXXAR ® |
| antihemophilic factor | Bioclate ™ |
| human growth hormone | BioTropin ™ |
| botulinum toxin type A | BOTOX ® |
| Alemtuzumab | Campath ® |
| acritumomab; technetium-99 labeled | CEA-Scan ® |
| alglucerase; modified form of beta-glucocerebrosidase | Ceredase ® |
| imiglucerase; recombinant form of beta-glucocerebrosidase | Cerezyme ® |
| crotalidae polyvalent immune Fab, ovine | CroFab ™ |
| digoxin immune fab [ovine] | DigiFab ™ |
| Rasburicase | Elitek ® |
| Etanercept | ENBREL ® |
| epoietin alfa | Epogen ® |
| Cetuximab | Erbitux ™ |
| algasidase beta | Fabrazyme ® |

TABLE I-continued

| Protein Product | Reference Listed Drug |
| --- | --- |
| Urofollitropin | Fertinex ™ |
| follitropin beta | Follistim ™ |
| Teriparatide | FORTEO ® |
| human somatropin | GenoTropin ® |
| Glucagon | GlucaGen ® |
| follitropin alfa | Gonal-F ® |
| antihemophilic factor | Helixate ® |
| Antihemophilic Factor; Factor XIII | HEMOFIL |
| adefovir dipivoxil | Hepsera ™ |
| Trastuzumab | Herceptin ® |
| Insulin | Humalog ® |
| antihemophilic factor/von Willebrand factor complex-human | Humate-P ® |
| Somatotropin | Humatrope ® |
| Adalimumab | HUMIRA ™ |
| human insulin | Humulin ® |
| recombinant human hyaluronidase | Hylenex ™ |
| interferon alfacon-1 | Infergen ® |
| eptifibatide | Integrilin ™ |
| alpha-interferon | Intron A ® |
| Palifermin | Kepivance |
| Anakinra | Kineret ™ |
| antihemophilic factor | Kogenate ® FS |
| insulin glargine | Lantus ® |
| granulocyte macrophage colony-stimulating factor | Leukine ®/Leukine ® Liquid |
| lutropin alfa for injection | Luveris |
| OspA lipoprotein | LYMErix ™ |
| Ranibizumab | LUCENTIS ® |
| gemtuzumab ozogamicin | Mylotarg ™ |
| Galsulfase | Naglazyme ™ |
| Nesiritide | Natrecor ® |
| Pegfilgrastim | Neulasta ™ |
| Oprelvekin | Neumega ® |
| Filgrastim | Neupogen ® |
| Fanolesomab | NeutroSpec ™ (formerly LeuTech ®) |
| somatropin [rDNA] | Norditropin ®/Norditropin Nordiflex ® |
| Mitoxantrone | Novantrone ® |
| insulin; zinc suspension; | Novolin L ® |
| insulin; isophane suspension | Novolin N ® |
| insulin, regular; | Novolin R ® |
| Insulin | Novolin ® |
| coagulation factor VIIa | NovoSeven ® |
| Somatropin | Nutropin ® |
| immunoglobulin intravenous | Octagam ® |
| PEG-L-asparaginase | Oncaspar ® |
| abatacept, fully human soluable fusion protein | Orencia ™ |
| muromomab-CD3 | Orthoclone OKT3 ® |
| high-molecular weight hyaluronan | Orthovisc ® |
| human chorionic gonadotropin | Ovidrel ® |
| live attenuated Bacillus Calmette-Guerin | Pacis ® |
| peginterferon alfa-2a | Pegasys ® |
| pegylated version of interferon alfa-2b | PEG-Intron ™ |
| Abarelix (injectable suspension); gonadotropin-releasing hormone antagonist | Plenaxis ™ |
| epoietin alfa | Procrit ® |
| Aldesleukin | Proleukin, IL-2 ® |
| Somatrem | Protropin ® |
| dornase alfa | Pulmozyme ® |
| Efalizumab; selective, reversible T-cell blocker | RAPTIVA ™ |
| combination of ribavirin and alpha interferon | Rebetron ™ |
| Interferon beta 1a | Rebif ® |
| antihemophilic factor | Recombinate ® rAHF/ |
| antihemophilic factor | ReFacto ® |
| Lepirudin | Refludan ® |
| Infliximab | REMICADE ® |
| Abciximab | ReoPro ™ |
| Reteplase | Retavase ™ |
| Rituxima | Rituxan ™ |
| interferon alfa-2[a] | Roferon-A ® |
| Somatropin | Saizen ® |
| synthetic porcine secretin | SecreFlo ™ |

TABLE I-continued

| Protein Product | Reference Listed Drug |
| --- | --- |
| Basiliximab | Simulect ® |
| Eculizumab | SOLIRIS (R) |
| Pegvisomant | SOMAVERT ® |
| Palivizumab; recombinantly produced, humanized mAb | Synagis ™ |
| thyrotropin alfa | Thyrogen ® |
| Tenecteplase | TNKase ™ |
| Natalizumab | TYSABRI ® |
| human immune globulin intravenous 5% and 10% solutions | Venoglobulin-S ® |
| interferon alfa-n1, lymphoblastoid | Wellferon ® |
| drotrecogin alfa | Xigris ™ |
| Omalizumab; recombinant DNA-derived humanized monoclonal antibody targeting immunoglobulin-E | Xolair ® |
| Daclizumab | Zenapax ® |
| ibritumomab tiuxetan | Zevalin ™ |
| Somatotropin | Zorbtive ™ (Serostim ®) |

In embodiments, the polypeptide is a hormone, blood clotting/coagulation factor, cytokine/growth factor, antibody molecule, fusion protein, protein vaccine, or peptide as shown in Table 2.

TABLE 2

Exemplary Products

| Therapeutic Product type | Product | Trade Name |
| --- | --- | --- |
| Hormone | Erythropoietin, Epoein-α | Epogen, Procrit |
| | Darbepoetin-α | Aranesp |
| | Growth hormone (GH), somatotropin | Genotropin, Humatrope, Norditropin, NovlVitropin, Nutropin, Omnitrope, Protropin, Siazen, Serostim, Valtropin |
| | Human follicle-stimulating hormone (FSH) | Gonal-F, Follistim |
| | Human chorionic gonadotropin | Ovidrel |
| | Lutropin-α | Luveris |
| | Glucagon | GlcaGen |
| | Growth hormone releasing hormone (GHRH) | Geref |
| | Secretin | ChiRhoStim (human peptide), SecreFlo (porcine peptide) |
| | Thyroid stimulating hormone (TSH), thyrotropin | Thyrogen |
| Blood Clotting/Coagulation Factors | Factor VIIa | NovoSeven |
| | Factor VIII | Bioclate, Helixate, Kogenate, Recombinate, ReFacto |
| | Factor IX | Benefix |
| | Antithrombin III (AT-III) | Thrombate III |
| | Protein C concentrate | Ceprotin |
| Cytokine/Growth factor | Type I alpha-interferon | Infergen |
| | Interferon-αn3 (IFNαn3) | Alferon N |
| | Interferon-β1a (rIFN-β) | Avonex, Rebif |
| | Interferon-β1b (rIFN-β) | Betaseron |
| | Interferon-γ1b (IFNγ) | Actimmune |
| | Aldesleukin (interleukin 2(IL2), epidermal theymocyte activating factor; ETAF | Proleukin |
| | Palifermin (keratinocyte growth factor; KGF) | Kepivance |
| | Becaplemin (platelet-derived growth factor; PDGF) | Regranex |
| | Anakinra (recombinant IL1 antagonist) | Anril, Kineret |
| Antibody molecules | Bevacizumab (VEGFA mAb) | Avastin |
| | Cetuximab (EGFR mAb) | Erbitux |
| | Panitumumab (EGFR mAb) | Vectibix |
| | Alemtuzumab (CD52 mAb) | Campath |
| | Rituximab (CD20 chimeric Ab) | Rituxan |
| | Trastuzumab (HER2/Neu mAb) | Herceptin |
| | Abatacept (CTLA Ab/Fc fusion) | Orencia |
| | Adalimumab (TNFαmAb) | Humira |
| | Etanercept (TNF receptor/Fc fusion) | Enbrel |
| | Infliximab (TNFαchimeric mAb) | Remicade |
| | | Amevive |
| | | Raptiva |
| | | Tysabri |
| | | Soliris |
| | | Orthoclone, OKT3 |

TABLE 2-continued

| Exemplary Products | | |
|---|---|---|
| Therapeutic Product type | Product | Trade Name |
| | Alefacept (CD2 fusion protein) | |
| | Efalizumab (CD11a mAb) | |
| | Natalizumab (integrin α4 subunit mAb) | |
| | Eculizumab (C5mAb) | |
| | Muromonab-CD3 | |
| Other: Fusion proteins/Protein vaccines/Peptides | Insulin | Humulin, Novolin |
| | Hepatitis B surface antigen (HBsAg) | Engerix, Recombivax HB |
| | HPV vaccine | Gardasil |
| | OspA | LYMErix |
| | Anti-Rhesus(Rh) immunoglobulin G | Rhophylac |
| | Enfuvirtide | Fuzeon |
| | Spider silk, e.g., fibrion | QMONOS |

In embodiments, the protein is multispecific protein, e.g., a bispecific antibody as shown in Table 3.

TABLE 3

| Bispecific Formats | | | | | |
|---|---|---|---|---|---|
| Name (other names, sponsoring organizations) | BsAb format | Targets | Proposed mechanisms of action | Development stages | Diseases (or healthy volunteers) |
| Catumaxomab (Removab ®, Fresenius Biotech, Trion Pharma, Neopharm) | BsIgG: Triomab | CD3, EpCAM | Retargeting of T cells to tumor, Fc mediated effector functions | Approved in EU | Malignant ascites in EpCAM positive tumors |
| Ertumaxomab (Neovii Biotech, Fresenius Biotech) | BsIgG: Triomab | CD3, HER2 | Retargeting of T cells to tumor | Phase I/II | Advanced solid tumors |
| Blinatumomab (Blincyto ®, AMG 103, MT 103, MEDI 538, Amgen) | BiTE | CD3, CD19 | Retargeting of T cells to tumor | Approved in USA Phase II and III Phase II Phase I | Precursor B-cell ALL ALL DLBCL NHL |
| REGN1979 (Regeneron) | BsAb | CD3, CD20 | | | |
| Solitomab (AMG 110, MT110, Amgen) | BiTE | CD3, EpCAM | Retargeting of T cells to tumor | Phase I | Solid tumors |
| MEDI 565 (AMG 211, MedImmune, Amgen) | BiTE | CD3, CEA | Retargeting of T cells to tumor | Phase I | Gastrointestinal adenocancinoma |
| RO6958688 (Roche) | BsAb | CD3, CEA | | | |
| BAY2010112 (AMG 212, Bayer; Amgen) | BiTE | CD3, PSMA | Retargeting of T cells to tumor | Phase I | Prostate cancer |
| MGD006 (Macrogenics) | DART | CD3, CD123 | Retargeting of T cells to tumor | Phase I | AML |
| MGD007 (Macrogenics) | DART | CD3, gpA33 | Retargeting of T cells to tumor | Phase I | Colorectal cancer |
| MGD011 (Macrogenics) | DART | D19, CD3 | | | |
| SCORPION (Emergent Biosolutions, Trubion) | BsAb | CD3, CD19 | Retargeting of T cells to tumor | | |

TABLE 3-continued

Bispecific Formats

| Name (other names, sponsoring organizations) | BsAb format | Targets | Proposed mechanisms of action | Development stages | Diseases (or healthy volunteers) |
|---|---|---|---|---|---|
| AFM11 (Affimed Therapeutics) | TandAb | CD3, CD19 | Retargeting of T cells to tumor | Phase I | NHL and ALL |
| AFM12 (Affimed Therapeutics) | TandAb | CD19, CD16 | Retargeting of NK cells to tumor cells | | |
| AFM13 (Affimed Therapeutics) | TandAb | CD30, CD16A | Retargeting of NK cells to tumor cells | Phase II | Hodgkin's Lymphoma |
| GD2 (Barbara Ann Karmanos Cancer Institute) | T cells preloaded with BsAb | CD3, GD2 | Retargeting of T cells to tumor | Phase I/II | Neuroblastoma and osteosarcoma |
| pGD2 (Barbara Ann Karmanos Cancer Institute) | T cells preloaded with BsAb | CD3, Her2 | Retargeting of T cells to tumor | Phase II | Metastatic breast cancer |
| EGFRBi-armed autologous activated T cells (Roger Williams Medical Center) | T cells preloaded with BsAb | CD3, EGFR | Autologous activated T cells to EGFR-positive tumor | Phase I | Lung and other solid tumors |
| Anti-EGFR-armed activated T-cells (Barbara Ann Karmanos Cancer Institute) | T cells preloaded with BsAb | CD3, EGFR | Autologous activated T cells to EGFR-positive tumor | Phase I | Colon and pancreatic cancers |
| rM28 (University Hospital Tübingen) | Tandem scFv | CD28, MAPG | Retargeting of T cells to tumor | Phase II | Metastatic melanoma |
| IMCgp100 (Immunocore) | ImmTAC | CD3, peptide MHC | Retargeting of T cells to tumor | Phase I/II | Metastatic melanoma |
| DT2219ARL (NCI, University of Minnesota) | 2 scFv linked to diphtheria toxin | CD19, CD22 | Targeting of protein toxin to tumor | Phase I | B cell leukemia or lymphoma |
| XmAb5871 (Xencor) | BsAb | CD19, CD32b | | | |
| NI-1701 (NovImmune) | BsAb | CD47, CD19 | | | |
| MM-111 (Merrimack) | BsAb | ErbB2, ErbB3 | | | |
| MM-141 (Merrimack) | BsAb | IGF-1R, ErbB3 | | | |
| NA (Merus) | BsAb | HER2, HER3 | | | |
| NA (Merus) | BsAb | CD3, CLEC12A | | | |
| NA (Merus) | BsAb | EGFR, HER3 | | | |
| NA (Merus) | BsAb | PD1, undisclosed | | | |
| NA (Merus) | BsAb | CD3, undisclosed | | | |
| Duligotuzumab (MEHD7945A, Genentech, Roche) | DAF | EGFR, HER3 | Blockade of 2 receptors, ADCC | Phase I and II Phase II | Head and neck cancer Colorectal cancer |
| LY3164530 (Eli Lily) | Not disclosed | EGFR, MET | Blockade of 2 receptors | Phase I | Advanced or metastatic cancer |
| MM-111 (Merrimack Pharmaceuticals) | HSA body | HER2, HER3 | Blockade of 2 receptors | Phase II Phase I | Gastric and esophageal cancers Breast cancer |
| MM-141, (Merrimack Pharmaceuticals) | IgG-scFv | IGF-1R, HER3 | Blockade of 2 receptors | Phase I | Advanced solid tumors |
| RG7221 (RO5520985, Roche) | CrossMab | Ang2, VEGF A | Blockade of 2 proangiogenics | Phase I | Solid tumors |
| RG7716 (Roche) | CrossMab | Ang2, VEGF A | Blockade of 2 proangiogenics | Phase I | Wet AMD |

TABLE 3-continued

Bispecific Formats

| Name (other names, sponsoring organizations) | BsAb format | Targets | Proposed mechanisms of action | Development stages | Diseases (or healthy volunteers) |
|---|---|---|---|---|---|
| OMP-305B83 (OncoMed) | BsAb | DLL4/VEGF | | | |
| TF2 (Immunomedics) | Dock and lock | CEA, HSG | Pretargeting tumor for PET or radioimaging | Phase II | Colorectal, breast and lung cancers |
| ABT-981 (AbbVie) | DVD-Ig | IL-1α, IL-1β | Blockade of 2 proinflammatory, cytokines | Phase II | Osteoarthritis |
| ABT-122 (AbbVie) | DVD-Ig | TNF, IL-17A | Blockade of 2 proinflammatory cytokines | Phase II | Rheumatoid arthritis |
| COVA322 | IgG-fynomer | TNF, IL17A | Blockade of 2 proinflammatory cytokines | Phase I/II | Plaque psoriasis |
| SAR156597 (Sanofi) | Tetravalent bispecific tandem IgG | IL-13, IL-4 | Blockade of 2 proinflammatory cytokines | Phase I | Idiopathic pulmonary fibrosis |
| GSK2434735 (GSK) | Dual-targeting domain | IL-13, IL-4 | Blockade of 2 proinflammatory cytokines | Phase I | (Healthy volunteers) |
| Ozoralizumab (ATN103, Ablynx) | Nanobody | TNF, HSA | Blockade of proinflammatory cytokine, binds to HSA to increase half-life | Phase II | Rheumatoid arthritis |
| ALX-0761 (Merck Serono, Ablynx) | Nanobody | IL-17A/F, HSA | Blockade of 2 proinflammatory cytokines, binds to HSA to increase half-life | Phase I | (Healthy volunteers) |
| ALX-0061 (AbbVie, Ablynx; | Nanobody | IL-6R, HSA | Blockade of proinflammatory cytokines, binds to HSA to increase half-life | Phase I/II | Rheumatoid arthritis |
| ALX-0141 (Ablynx, Eddingpharm) | Nanobody | RANKL, HSA | Blockade of bone resorption, binds to HSA to increase half-life | Phase I | Postmenopausal bone loss |
| RG6013/ACE910 (Chugai, Roche) | ART/Ig | Factor IXa, factor X | Plasma coagulation | Phase II | Hemophilia |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims.

What is claimed is:

1. A filter moving device comprising:
   a frame having a first end, a second and opposite end, and defining a height there between, the first end of the frame comprising an open end leading to an interior space within the frame, the open end having a size and the frame having a height such that the open end of the frame can be placed over a filter cartridge stack contained in a filter assembly;
   a plurality of lifting elements located on the frame, the lifting elements being movable between an engaging position and a disengaging position, wherein, when in the engaging position, the lifting elements engage a filter cartridge stack located within the interior space of the frame wherein the lifting elements are arranged in groups and wherein the lifting elements in a group are located at different positions around the interior space of the frame at the same height on the frame and wherein there are at least two groups of lifting elements located at different heights on the frame; and
   a locking mechanism that locks the lifting elements in the engaging position.

2. A filter moving device as defined in claim 1, wherein the frame has a cylindrical shape including a plurality of circular frame members attached together by a plurality of vertical frame members.

3. A filter moving device as defined in claim 1, wherein the device includes from two to ten groups of lifting elements, each group being at a different height on the frame.

4. A filter moving device as defined in claim 3, wherein the groups of lifting elements are not equally spaced along the height of the frame.

5. A filter moving device as defined in claim 4, wherein the frame includes a bottom end and a top end and wherein the groups located in the bottom end are spaced closer together than the groups of lifting elements located in the top end.

6. A filter moving device as defined in claim 1, wherein the lifting elements pivot between the engaging position and the disengaging position.

7. A filter moving device as defined in claim 1, wherein the lifting elements are arranged in vertical columns on the frame around the interior space of the frame.

8. A filter moving device as defined in claim 7, wherein the device includes at least three vertical columns of lifting elements.

9. A filter moving device as defined in claim 1, wherein the lifting elements are attached to vertical rod members, the vertical rod members being pivotally attached to the frame for moving the lifting elements between the engaging position and the disengaging position.

10. A filter moving device as defined in claim 9, wherein the frame defines a circumference around the interior space and wherein the vertical rod members are equally spaced around the circumference.

11. A filter moving device as defined in claim 9, wherein the device includes from three to six vertical rod members.

12. A filter moving device as defined in claim 9, wherein the vertical rod members have a top end and a bottom end and wherein the top end of each vertical rod member includes a cross member that extends across the interior space of the frame, and wherein the locking mechanism engages each cross member of the vertical rod members for locking the lifting elements in the engaging position.

13. A filter moving device as defined in claim 12, wherein each cross member of the vertical rod members overlap each other when the lifting elements are in the engaging position.

14. A filter moving device as defined in claim 13, wherein each cross member defines a locking aperture and wherein the locking mechanism comprises a pin that extends through each locking aperture for locking the lifting elements in the engaging position.

15. A filter moving device as defined in claim 12, wherein each cross member includes a handle for manually pivoting the rod members between the engaging position and the disengaging position.

16. A filter moving device as defined in claim 14, wherein the pin is tethered to the frame.

17. A filter moving device as defined in claim 1, wherein the frame is made from a material comprising a metal.

18. A filter moving device as defined in claim 1, wherein the frame further comprises a connector located at the second end of the frame, the connector being configured to be attached to a lifting mechanism for raising and lowering the filter moving device.

19. A method for removing a filter cartridge stack from a filter assembly comprising;
   placing the filter moving device as defined in claim 1 over a filter cartridge stack containing a plurality of filter cartridges, wherein the open end of the frame is placed over the filter cartridge stack while the lifting elements are in the disengaging position;
   moving the lifting elements from the disengaging position to the engaging position such that the lifting elements are positioned below certain of the filter cartridges contained in the filter cartridge stack; and
   raising the filter moving device which thereby engages and lifts the filter cartridge stack for removal.

\* \* \* \* \*